Aug. 25, 1964 G. W. STURM ETAL 3,145,854
SHIP AND CARGO HANDLING EQUIPMENT
Filed July 15, 1960 9 Sheets-Sheet 1
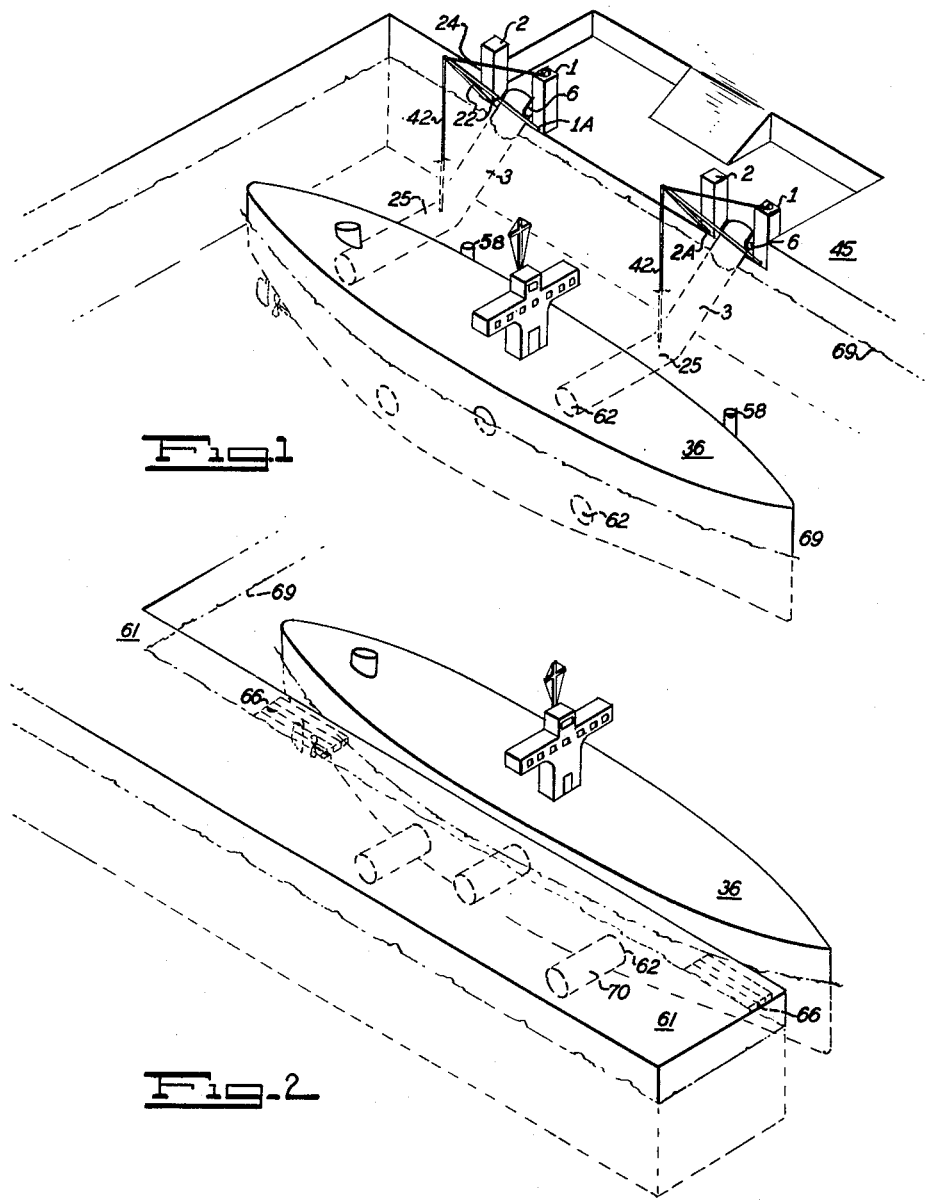
INVENTORS
GEORGE W. STURM
ALAN OSBOURNE
BY Mason, Mason & Albright
ATTORNEYS

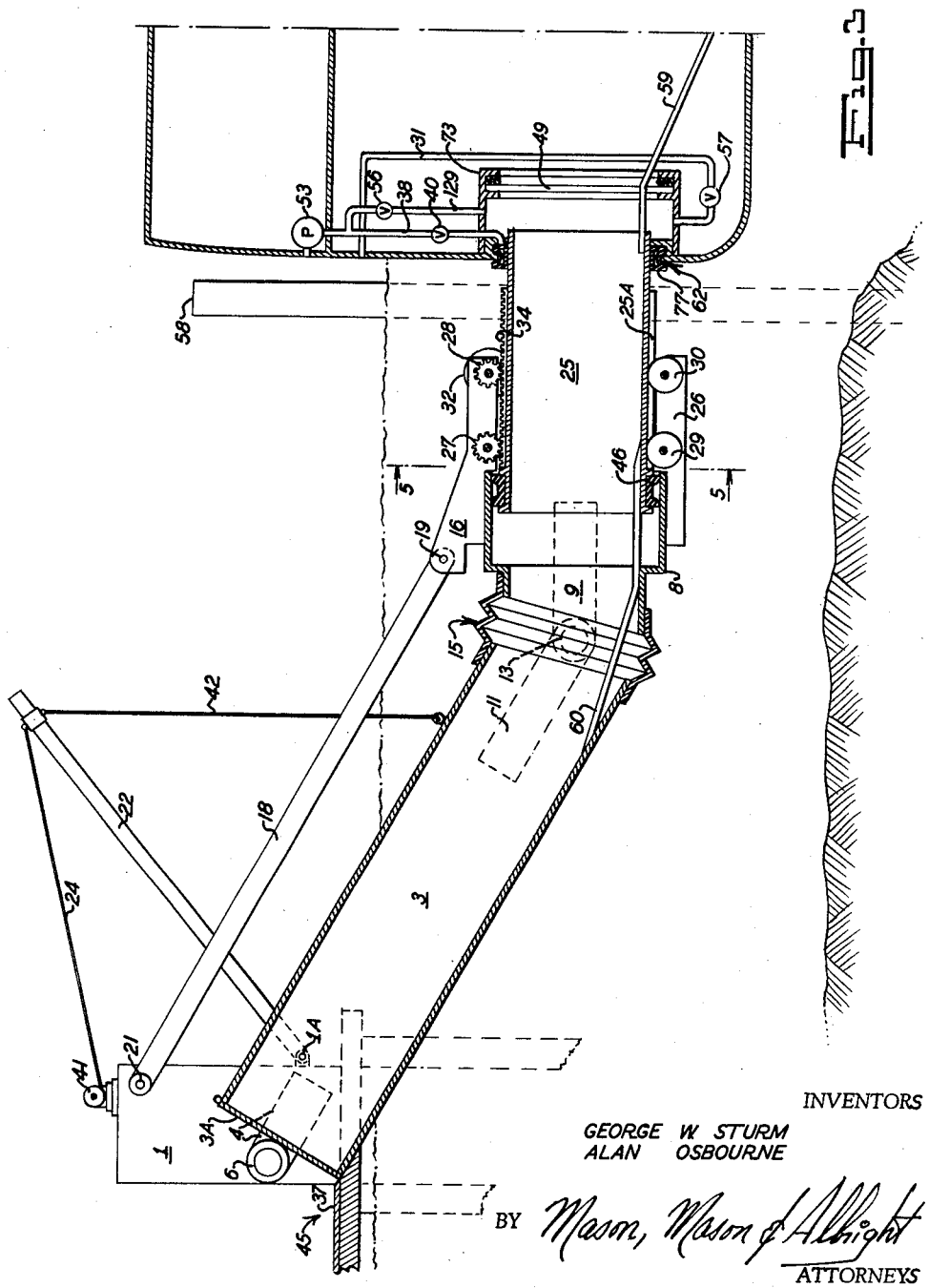

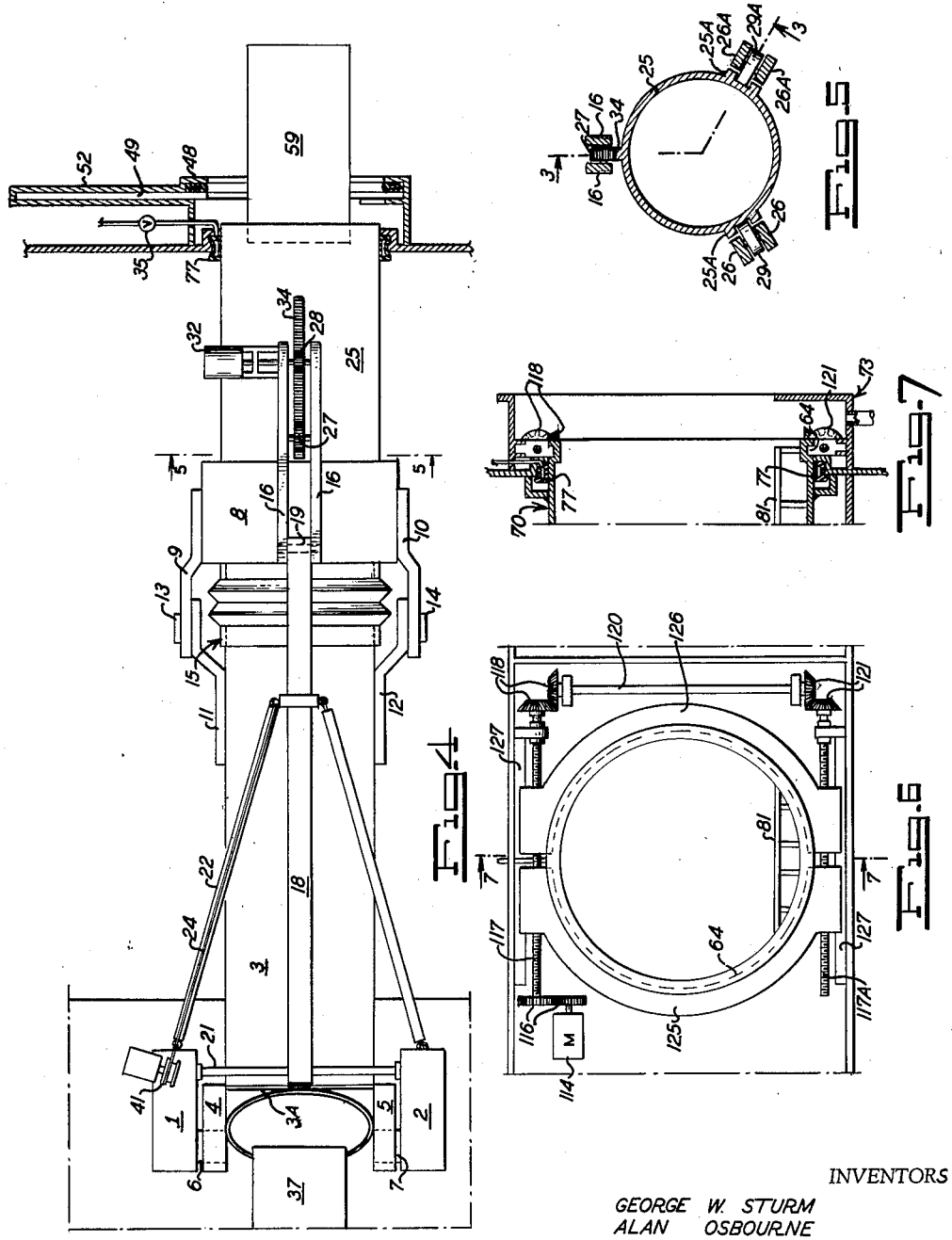

Aug. 25, 1964  G. W. STURM ETAL  3,145,854
SHIP AND CARGO HANDLING EQUIPMENT
Filed July 15, 1960  9 Sheets-Sheet 4

INVENTORS
GEORGE W. STURM
ALAN OSBOURNE

BY *Mason, Mason & Albright*

ATTORNEYS

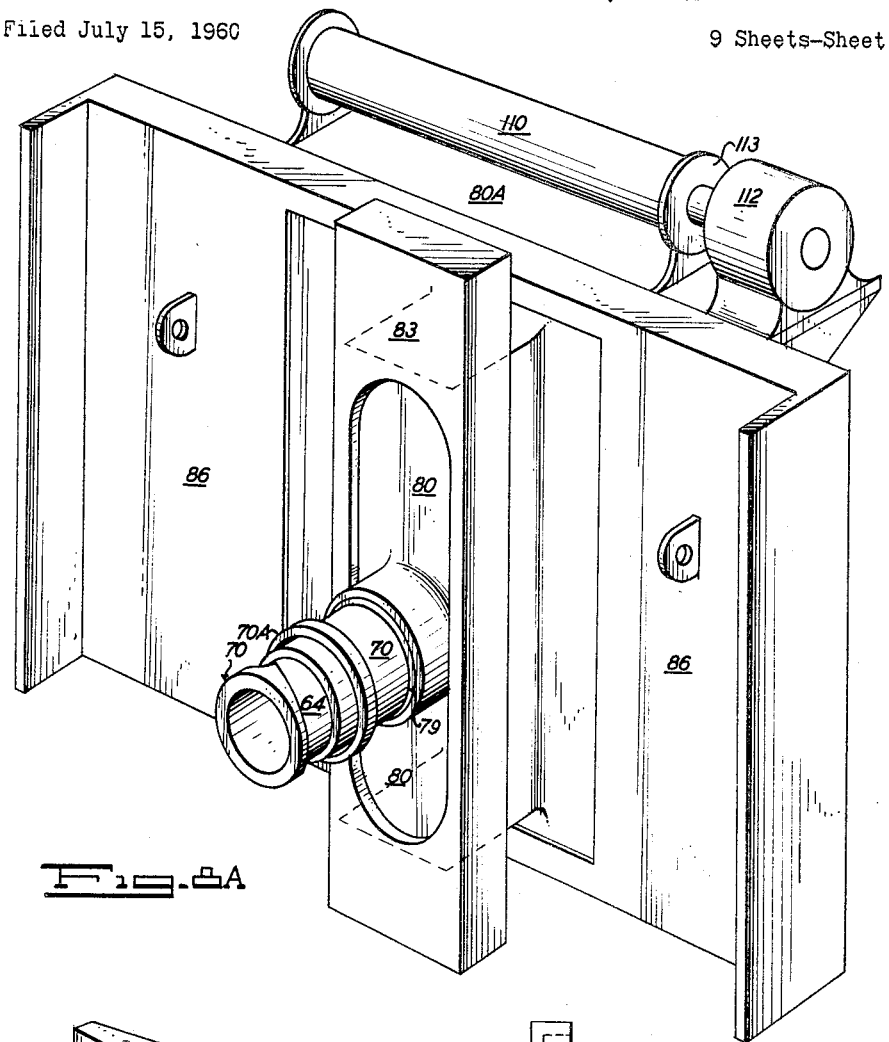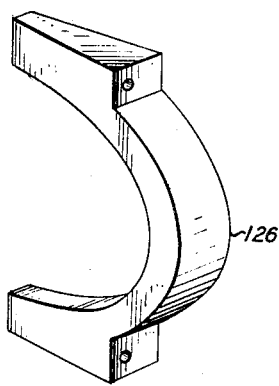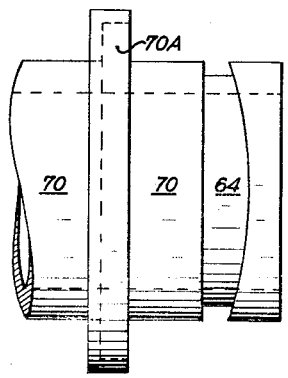

INVENTORS
GEORGE W. STURM
ALAN OSBOURNE
BY Mason, Mason & Albright
ATTORNEYS

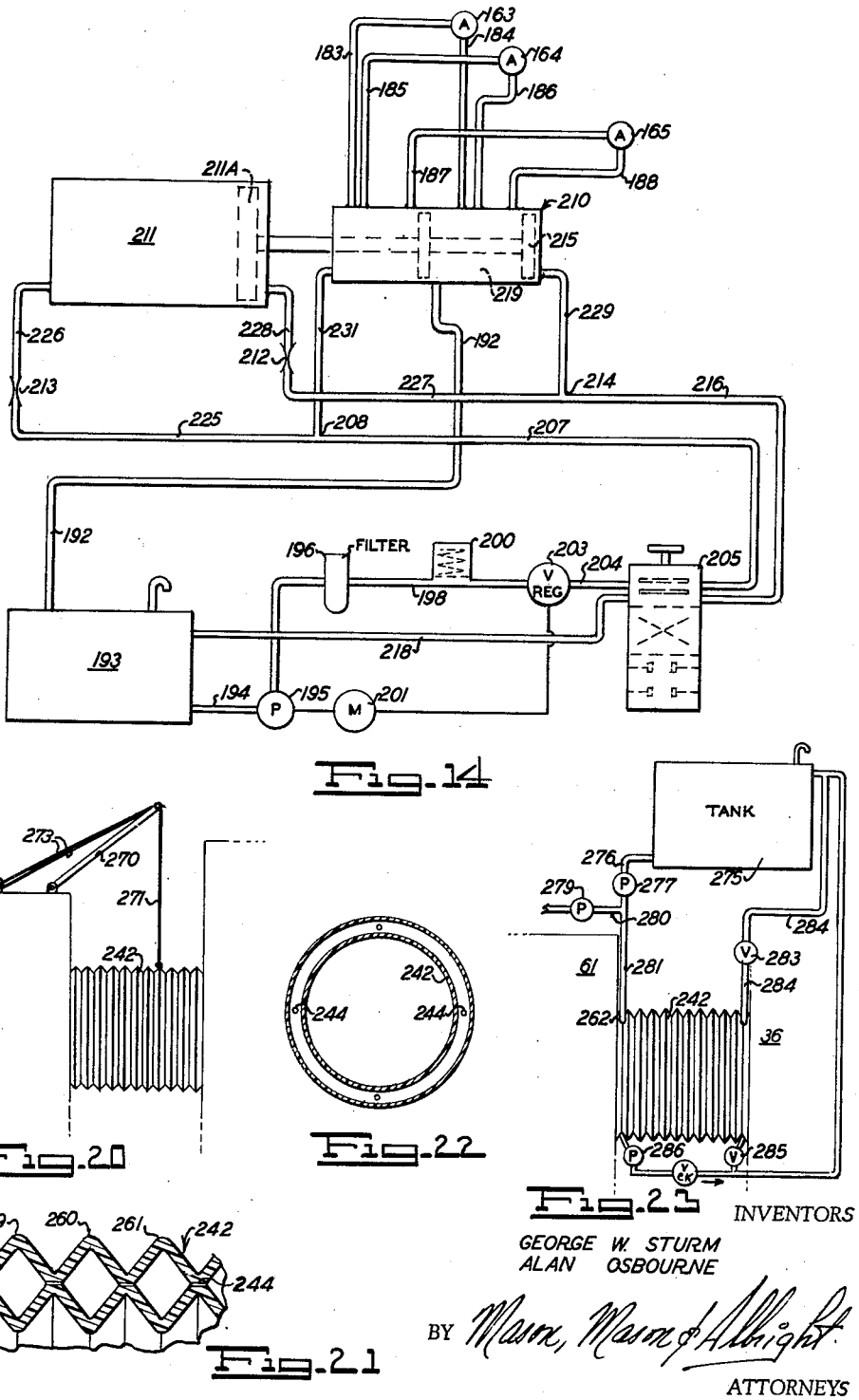

Aug. 25, 1964     G. W. STURM ETAL     3,145,854
SHIP AND CARGO HANDLING EQUIPMENT
Filed July 15, 1960     9 Sheets-Sheet 9
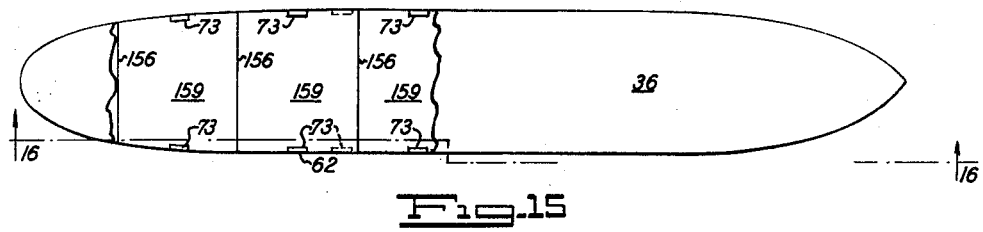
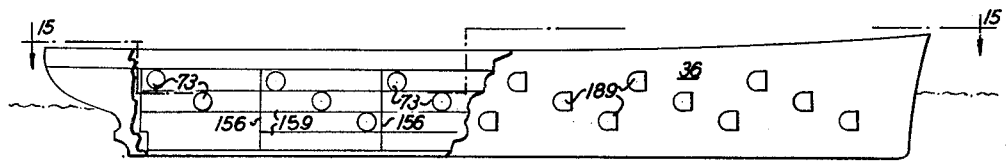
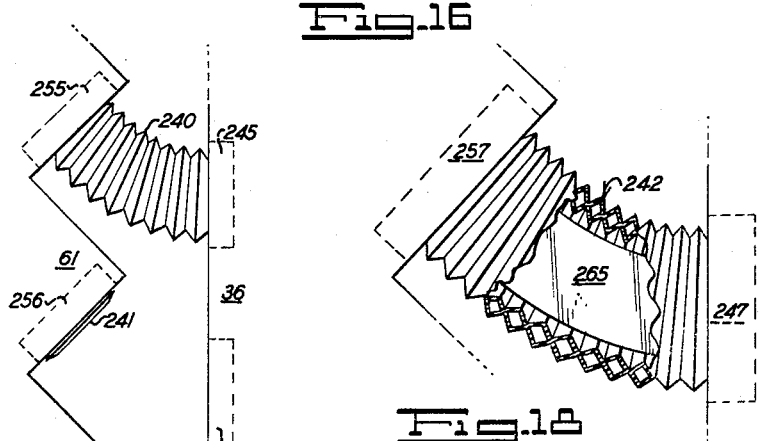
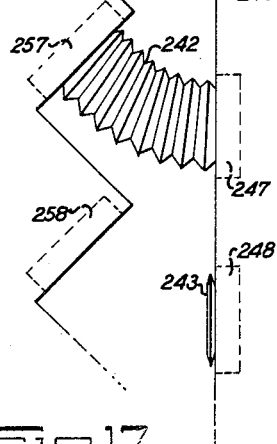
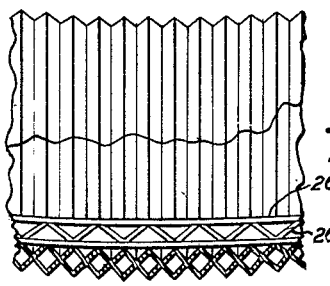
INVENTORS
GEORGE W. STURM
ALAN OSBOURNE
BY *Mason, Mason & Albright*
ATTORNEYS

United States Patent Office 3,145,854
Patented Aug. 25, 1964

3,145,854
SHIP AND CARGO HANDLING EQUIPMENT
George William Sturm, 514 Ethan Allen Ave., Takoma Park, Md., and Alan Osbourne, Cabin John, Md.; said Osbourne assignor to said Sturm
Filed July 15, 1960, Ser. No. 43,077
26 Claims. (Cl. 214—14)

This invention relates to a vessel with a novel arrangement of cargo space and more particularly to such vessel and cargo handling equipment which will permit cargo handling through side ports in the hull below the ship's water line.

Most contemporary cargo ships of conventional design include a number of vertical bulkheads spaced transversely within the hull and several horizontal decks spaced vertically within the hull and bulkheads. Loading and unloading are accomplished through hatches in the decks. With this design, speed of loading and unloading is inherently restricted because the upper decks must be largely cleared before the lower decks can be unloaded, and also due to delay incident to lifting cargo to the upper decks and lowering it to the pier, or vice versa, for each new load. As a result of the delay, today's merchant cargo ships spend days and frequently weeks at dockside in a single port, loading and unloading cargo. This is inefficient employment of the ship and the demurrage adds greatly to the over-all costs of operating the ship.

In recent years, a few ships have been built wherein palletized or containerized cargo may be loaded or unloaded primarily through ramps and side ports in the ship. An example of such a ship is the USNS Comet, a roll-on, roll-off ship built by the Navy, which has been in operation since early 1958. The deck arrangement on such ships permits a reduction of the loading time to a matter of hours or, at most, a few days, but has the disadvantages that certain transverse bulkheads are either reduced or eliminated or equipped with watertight doors, and that the space below the load water line is not effectively utilized. Known ships of this type, therefore, have considerably less watertight integrity than conventional ships and are essentially shallow-draft vessels.

It is an object of our invention to provide a ship with a deck system which has improved watertight integrity and which is, at the same time, capable of rapid loading and unloading from all cargo spaces, including those below the load water line.

A further object of the invention is to provide a cargo handling system whereby cargo can be loaded and unloaded from an underwater side port in the hull of a vessel.

The system herein described presents the advantage that cargo handling is not affected by adverse weather conditions. When the system is incorporated in a passenger ship, the cargo spaces and passenger quarters can be entirely separate and the nuisance to passengers incident to cargo handling operations is largely eliminated.

No winches or special equipment are required on the upper deck with a corresponding weight reduction and a resulting lower center of gravity for the ship, thereby increasing the ship's stability. Additionally, the upper decks are clear for the enjoyment of passengers or for deck cargo. The absence of hatches on the upper decks means that there is less chance of accidents to personnel due to falling or being hit by falling cargo. The absence of loading gear on the weather deck permits improved vision from the bridge. For the same reason less guns and smaller gun crews are required in comparison with conventional ships inasmuch as the firing arc of each gun is significantly larger.

There are more watertight compartments which increase the over-all safety of the vessel. Any cargo space can be loaded or unloaded separately without disturbing cargo in the decks above or below it. Cargo handling is concealed, which has certain obvious military values. Also in the same vein, there is a protection from atomic radiation fall-out, and the ship may be loaded or unloaded successfully in the presence of significant atomic radiation fall-out sufficient to prohibit conventional cargo handling. The invention is particularly adaptable for underwater cargo handling to, from and between ships, submarines and structures either above or below water. Further, the side ports are so disposed between the decks that the hull structure is actually stronger for the same weight than a conventional ship, permitting economies in construction costs. Improved cargo selectivity and control exists. There is a reduction of pilferage. Fire hazard is reduced due to the compartmentation.

Long tunnels of the type contemplated may be used to connect ship to shore in lieu of conventional lighter service. Such tunnels may rest on the sea bottom or be provided with floats, or have their own ballast system.

The pier or loading dock may be conventional, fixed piers with levels below and above water, floating barge type piers with several levels above and under water, or completely under water, is desired.

It will be appreciated that the deck system disclosed herein may be restricted to certain spaces within the ship such as to areas below the water line, and may be used in combination with known or conventional cargo space arrangements or deck arrangements.

To these and other ends the invention resides in certain improvements and combinations as will be hereinafter more fully described, the novel features being pointed out in the claims at the end of the specification.

In the drawings:

FIGURE 1 is a perspective view of a ship and pier with cargo handling gear in place;

FIGURE 2 is a view similar to FIGURE 1, showing a second embodiment of the cargo handling gear;

FIGURE 3 is a sectional view of the cargo handling gear shown in FIGURE 1 taken on section line 3—3 in FIGURE 5;

FIGURE 4 is a top plan view of the cargo handling gear shown in FIGURE 1;

FIGURE 5 is a sectional view of a tunnel portion taken on section line 5—5 in FIGURE 4;

FIGURE 6 is an elevation of half doors for engaging a tunnel portion;

FIGURE 7 is a sectional view of a tunnel portion secured by the half doors taken on section line 7—7 in FIGURE 6;

FIGURE 7A is a perspective view of one of the half doors shown in FIGURE 6;

FIGURE 7B shows a detail view of the outer end of a tunnel portion;

FIGURE 8A is a perspective view of the cargo handling gear shown in FIGURE 2 for underwater installation in a pier;

FIGURE 14 shows the hydraulic system for opening and closing the door shown in FIGURE 12;

FIGURE 15 is a plan view of a ship in partial section (section 15—15 of FIGURE 16) showing the location of the side port doors;

FIGURE 16 is a side view of a ship in partial section (section 16—16 of FIGURE 15) showing the location of the side port doors;

FIGURE 17 is an alternative embodiment for the cargo handling gear involved in this invention wherein a collapsible tunnel is employed;

FIGURE 18 shows a top view of the collapsible tunnel in partial section;

FIGURE 19 shows a side view of the collapsible tunnel in partial section;

FIGURE 20 shows a side view of the collapsible tunnel in position between a pier and ship;

FIGURE 21 is a sectional detail of a portion of the collapsible tunnel;

FIGURE 22 is a cross-sectional view of the collapsible tunnel; and

FIGURE 23 is a diagrammatic view of the buoyancy counteracting system for the collapsible tunnel.

Figure 6A:
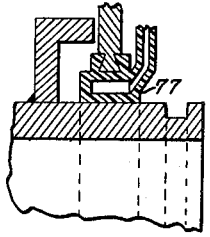
FIGURE 6A is a section of a secured O-ring gasket employed in the invention.
Figure 8:
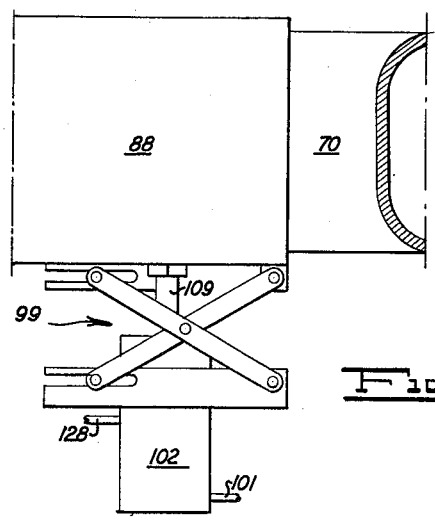
FIGURE 8 is a side view of the supporting means within the pier for the tunnel shown in FIGURE 2.
Figure 10A:
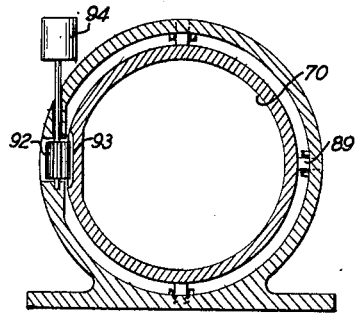
FIGURE 10A is a sectional view taken on lines 10A—10A in FIGURE 10.

In the drawings, FIGURE 1 shows a ship 36 alongside pier 45 and FIGURE 2 a ship 36 alongside pier 61. In FIGURE 1, tunnel 3 leads from above the water line at pier 45, to which it is secured, to a connected lower tunnel 25 and into ship 36 at underwater ports 62 below water line 69. In FIGURE 2, tunnel 70 connects a similar ship 36 with pier 61 below water line 69. FIGURES 15 and 16 show more specifically the location of the ports 62 and side port doors 189 in relation to the cargo space arrangement of ship 36. In FIGURES 15 and 16, watertight side port doors 189 are closed over side ports 62 which, in turn, lead into the ship's watertight vestibules 73. The transverse bulkheads 156 and the decks 159 are continuous and unbroken. Thus the only entrances into each cargo space are through ports 62 and vestibules 73. Of course, emergency or alternate accesses may be provided as desired.

In operation, ship 36 backs into a berth next to pier 45 or 61. With the embodiment disclosed in FIGURES 1 and 3, ship 36 is warped sidewise against a pair of dolphins 58 and is adjusted fore and aft until the underwater side port doors 189 (see FIGURES 12, 13, 15 and 16) are suitably lined up with the underwater loading tunnels 25 and the ship is then secured and the appropriate underwater side port doors 189 are opened.

Figure 9:
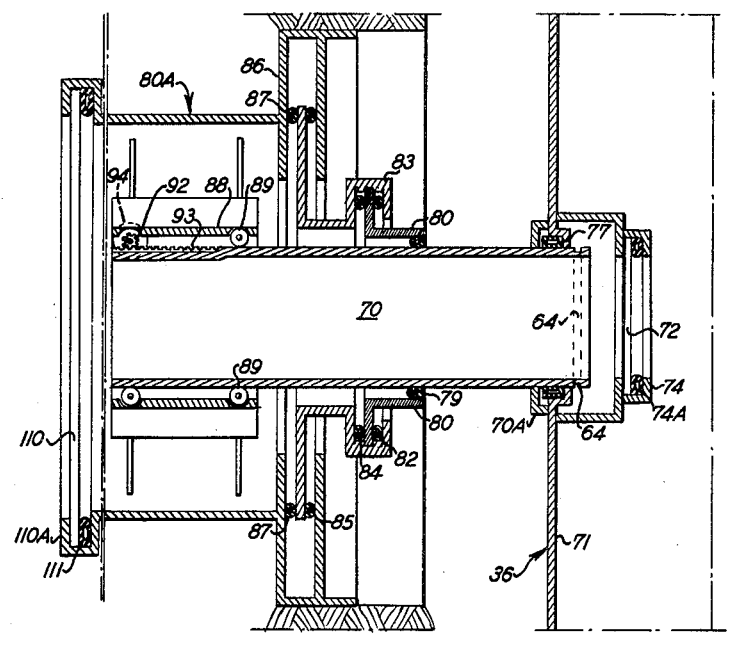
FIGURE 9 is a top sectional view of the cargo handling gear shown in FIGURE 2.
Figure 10:
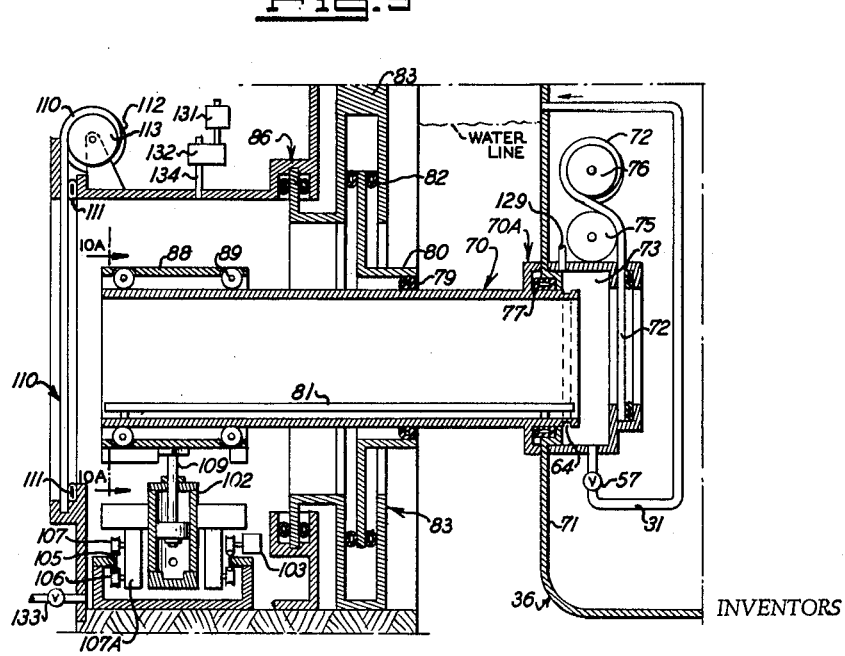
FIGURE 10 is a side sectional view of the cargo handling gear shown in FIGURE 2.

In the embodiment shown in FIGURES 2, 9 and 10, ship 36 is warped against floating camels 66 which lie against pier 61, and adjusted fore and aft so that side port doors 189 are suitably opposite tunnels 70. The ship is then secured and doors 189 are opened as desired.

Referring to FIGURE 3, and the embodiment disclosed generally in FIGURE 1, winches 41 secured on spaced standards 1 lift or lower the associated upper tunnel portion 3 through linkage means comprising a cable 24 attached to boom 22 which is pivotally secured to the standards 1 and 2 at 1A and 2A and controlled by cables 24 which are secured to winches 41 on one end and to corresponding boom 22 on the other. Cable 42 connects boom 22 on one end and tunnel 3 on the other. Upper tunnel portion 3 is hingedly connected to the pier through trunnions 6 and 7 (see FIGURE 4). Trunnion 7 pivotally connects standard 2 and the upper tunnel trunnion arm 5 which is secured to upper tunnel 3. Trunnion 6 similarly connects standard 1 and arm 4 which is secured to upper tunnel 3.

The lower tunnel 25 follows the upper tunnel 3 in the latter's vertical movement through hinge means comprising sleeve brackets 9 and 10 secured to sleeve 8, and trunnion arms 11 and 12 which are secured to upper tunnel portion 3. The trunnion arms 11 and 12 and the sleeve brackets 9 and 10 are hinged together by hinge pins 13 and 14 located adjacent the elastomer bellow connector 15 connected to tunnel 3 and sleeve 8. Sleeve 8, to which sleeve brackets 9 and 10 are secured, telescopically carries the lower tunnel portion 25 between gear 28 and idler gear 27 which are journaled in twin arm 16, wheels 29 and 30 which are journaled in twin arm 26, and wheels 29A and 30A which are journaled in twin arm 26A. It will be understood that the twin arms 26 and 26A are positioned less than 180° from twin arm 16 as shown in FIGURE 5. It will be noted that in FIGURE 3 the tunnel portion 25 is taken on section 3—3 as shown in FIGURE 5 for convenience of illustration. Arms 16, 26 and 26A are rigidly secured to sleeve 8. An elastomer gasket ring 46 is carried between sleeve 8 and lower tunnel portion 25.

Lower tunnel portion 25 is maintained substantially parallel to the surface of the water and perpendicular to the hull of ship 36 at all times due to link motion elements made up of an axle 21, a link pin 19, with link 18 therebetween, trunnions 6 and 7, and hinge pins 13 and 14; said trunnions and hinge pins being held apart by upper tunnel 3. It will be appreciated that parts 6 and 7, 13 and 14, 19, and 21 coincide with the corners of a parallelogram whereby an imaginary line intersecting parts 13 and 19 will maintain itself parallel with an imaginary line intersecting parts 6 and 21, and the extension angle of lower tunnel portion 25 will remain constant within structural limitations.

After the ship has been placed in position as shown in FIGURE 1, tunnels 25 are in position approximately opposite the desired side port doors 189. Doors 189 are opened through means which will be described hereinafter in more detail.

The airtight door 3A to the upper end of tunnel portion 3 is closed as shown in FIGURE 3. It will be noted that side port opening 62 in the hull of ship 36 is under water. For this reason, the ship's inner watertight door 49 must be closed until the water is evacuated from the tunnel portions and antrum of the ship. The outward end of lower tunnel 25 is inserted into side port 62 by means of a watertight electric motor 32 which is attached to arm 16. The motor 32 turns gear 28 which meshes with a rack 34, the rack 34 being secured to top tunnel 25. This, in turn, reciprocates tunnel 25 in sleeve 8, as desired to position the opposite end of tunnel 25 in port 62.

When the end of lower tunnel 25 is within port 62, as shown in FIGURES 3 and 4, valve 40 is opened and air under pressure from an air compressor 53 or other suitable air pressure source connected to line 38 inflates an O-ring pneumatic rubber gasket 77 which effects a watertight seal between lower tunnel 25 and side port 62 and tends to lock them together. It will be appreciated that the water inside the upper tunnel 3, lower tunnel 25, and within antrum 73 to the watertight door 49, is, with the described arrangement, completely sealed from the outside water.

O-ring gasket 77 is shown in FIGURE 3 and other figures as not being flush with the ship. However, it will be realized that in practice O-ring gasket 77 is usually secured within the ship's hull. FIGURE 6A shows a means of securing an O-ring gasket. The securing means shown in this figure and other securing means for such gaskets are well known in the art. Generally for this reason and in order to simplify the drawings, the securing means of the various O-ring gaskets have not been shown in the various drawings.

Evacuation of the foregoing water in the tunnel portions and antrum can be accomplished by any number of methods as would occur to those skilled in the art. For example, an outlet line from the lower portions of antrum 73 may be led to the inlet of the main or auxiliary condenser circulating pump or to the ship's bilge pump system or to both. With such an arrangement there is no necessity for door 3A. In the embodiment shown in FIGURES 3 and 4 with door 3A closed, the ship's screw-down check valve 57 is opened. The motor of air compressor 53 is actuated and compressed air enters the antrum 73 through valve 56 and pipe 129. At first, only the top of the antrum 73 fills with air, the excess water being discharged overboard through valve 57. Shortly thereafter the air finds its way from antrum 73 into lower tunnel portion 25, past the corrugated watertight connection 15 between lower tunnel portion 25 and upper tunnel portion 3, and into upper tunnel portion 3. Surplus water continues to discharge through valve 57. The complete freeing of the antrum 73 and tunnel portions 3 and 25 of water is signified by the water ceasing to flow out of the overboard water discharge pipe 31, which discharge is above the water line.

Compressor 53 is then stopped and check valve 57 automatically closes. Any air pressure above atmospheric pressure within the antrum and tunnel spaces may be relieved through the pump of compressor 53 or any other suitable venting means. At this time airtight door 3A and watertight door 49 are opened, and ramps 59, 60 and 37 are moved into position as shown in the drawings. FIGURE 4 shows the door 3A opened and ramp 37 in place. Trucks or other carriers or conveyors are run from dock into the ship's hold, loaded with cargo and returned to the pier 45 and shore. As unloading proceeds, the ship rides higher in the water and while doing so it will tend to lift the lower tunnel portion 25. As lower tunnel portion 25 rises, two actions simultaneously occur: (a) the upper tunnel portion 3 tends to become more nearly parallel to the water surface, revolving around pivots 6 and 7. This, in turn, causes the sleeve 8 to move closer to the ship and (b) the lower tunnel portion 25 which is locked into the ship's hull by O-ring gasket 77 or other securing means, or both, slides on its other end into sleeve 8. A watertight seal is maintained between sleeve 8 and tunnel portion 25 by a rubber seal 46 which extends around lower tunnel portion 25 near its inner end. Such leakage that might occur around seal 46 will drain into antrum 73 from which it may be pumped overboard through the ship's bilge system or by condenser circulating water pumps as previously mentioned. Any tendency of the ship to list is corrected by standard seagoing methods.

Loading of the ship is just the reverse of the above. When the loading is completed, the fork lift trucks or other carriers or conveyors are returned to the pier 45. Ramps 59, 60 and 37 are removed. Watertight door 49 is closed. Compressed air within O-ring gasket 77 is released through valve 35 (see FIGURE 4) and the other end of the lower tunnel portion 25 is withdrawn from side port 62 by actuation of motor 32. The side port door 189 is closed and secured. Compressor 53 is started to clear antrum 73 of water through the water-discharge line by way of stop-check valve 57. The ship is then in condition to proceed to sea.

Referring now to the embodiment generally disclosed in FIGURE 2 and FIGURES 7, 8, 8A, 9, 10 and 10A, structure is shown for "level loading" a ship from underwater side port 62 to the underwater portion of pier 61. Side port door 189, tunnel 70 and pier door 110 are all located under water line 69.

The horizontal metal tunnel 70, which is shown here to be of circular cross section but may be oval, rectangular or any other shape suitable to the purpose, is located in pier enclosure vestibule 80A from whence it extends outwardly and is supported by a metal sleeve 88 through rolling wheels 89 which are located between the tunnel 70 and the sleeve 88. Horizontal reciprocating motion of tunnel 70 is accomplished by means of gear 92 which is turned by an electric motor 94. For this purpose, gear 92 engages rack 93 extending longitudinally in the inboard portion of tunnel 70 and secured thereto. The tunnel sleeve 88 is supported by a hydraulic jack piston 109 and is maintained in a horizontal position by the lazy-tong linkages 99 (see FIGURE 8). The hydraulic jack piston 109 moves vertically in response to the pressure of a hydraulic fluid within hydraulic cylinder 102. Hydraulic fluid for raising or lowering piston 109 enters the cylinder 102 through flexible hose 101 and hose 128, respectively. Hydarulic cylinder 102 is supported by bogie 107A. Bogie 107A, in turn, is carried on horizontal track 105 by wheels 107. Wheels 106 are included below track 105 to prevent bogie 107A from being lifted off track 105. Wheels 107 move the bogie 107A horizontally along tracks 105 by a submersible motor 103 which is connected so as to cause wheels 107 to rotate when motor 103 is energized. A driveway 81 may be placed within tunnel 70. Ramps such as ramp 59 may be placed at either end of tunnel 70 to connect with driveway 81. A collar 70A may be employed on tunnel 70 which will touch the ship's hull 71 when tunnel 70 is correctly positioned in side port 62.

Pier door 80, which extends around tunnel 70, consists of a metal plate which moves vertically within a further door 83. Door 83 moves horizontally within the stationary portion of watertight door frame 86. The vertical movement of the door 80 and the horizontal movement of door 83 are synchronized electrically, hydraulically or pneumatically with the vertical movement of piston 109 and the horizontal movement of bogie 107A, respectively.

An O-ring pneumatic gasket 79 creates a watertight connection between tunnel 70 and pier door 80. Further O-ring gaskets 82 and 74 create a watertight connection between doors 80 and 83. Yet further O-ring gaskets 85 and 87 create a watertight connection between door 83 and the stationary portion of watertight door frame 86.

Referring now particularly to FIGURES 6 and 7, there is shown a method of locking tunnel 70 into ship's watertight vestibule 73 in a closed, locked position. It is contemplated that this locking means may also be employed in the embodiment disclosed in FIGURES 3 and 4.

Half doors 125 and 126 move horizontally along guide rails 127. Half doors 125 and 126 are wedge-shaped as shown in the perspective view FIGURE 7A so that as the half doors approach each other, the grooves 64 in the ship's tunnel 70 (see FIGURE 7B) are shaped to receive half doors 125 and 126 in order that tunnel 70 or 25 may be locked securely into position. The width of groove 64 is exaggerated in FIGURE 8A for illustrative purpose.

Half doors 125 and 126 are moved horizontally either together or apart by means of rotating threaded shafts 117 and 117A. In FIGURE 6, the threaded shaft 117 has a right-hand thread on its right side, and the left side is threaded left-hand while shaft 117A has its right side threaded left-hand and its left side threaded right-hand. Electric motor 114 rotates threaded shaft 117 through gears 116 which, in turn, through gears 118, rotates shaft 120. Further gears 121 journaled to shafts 120 and 117A cause threaded shaft 117A to rotate with shaft 120. By controlling the rotation of motor 114, half doors 125 and 126 are moved together or apart. A pneumatic gasket 77 outboard of groove 64 insures watertight integrity.

Pipe 31 (FIGURE 10) leads, via valve 57, overboard above the ship's load line. Line 129 leads into antrum 73 and may be used to conduct air into antrum 73 either under compression or for venting purposes. Antrum 73 shown in FIGURES 3, 4, 9 and 10, will, it will be understood, normally be identical both operatively and structurally and contain the same equipment to receive a tunnel portion.

Figure 11:
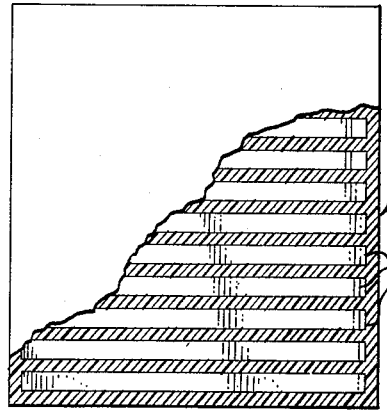
FIGURE 11 is a watertight door in partial section.
Figure 11A:
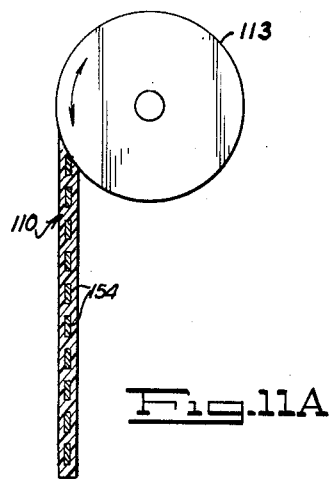
FIGURE 11A is a side sectional view of the watertight door shown in FIGURE 11.

Referring now to FIGURE 11, the curtain-type watertight door 110 is made of a strong oil and water-resistant elastomer, such as urethane, reinforced with metal slats or bars 154 composed of a metal compatible with the elastomer, preferably steel. These bars 154 may be solid bars or hollow tubes. Metals not compatible with the elastomer may be employed with plating or other sheathing interposed between the metal and the elastomer. It will frequently be found advantageous to provide an outer ply of fire-resistant material for door 110.

Referring now back to FIGURE 10, electric motor 112 rotates door 110 around or from reel 113 to raise or lower door 110 as desired. In raising or lowering, door 110 follows guides 110A. A pneumatic gasket 111 which extends between guides 110A and door 110 may be integral with door 110 or with guides 110A or separate, as desired. This gasket 111 enables the door 110 to be watertight.

Vestibule 80A may be maintained in a watertight condition. When it is desired to evacuate water from vestibule 80A, motor 131 turns compressor 132 and compressed air is forced into vestibule 80A through line 134 whereas water in the vestibule is drained through drainage valve 133.

Door 49, as shown in FIGURES 3 and 4, has essentially the same structure as the afore-mentioned door 110. However, door 49 as shown in FIGURE 4 is to slide in a pocket 52 guided within door frame 48 rather than be wound on a reel. It will be appreciated that the doors may either be wound or slid manually or through automatic controls, as desired.

Doors 110 and 72 may be reinforced with vertical bars to reduce the horizontal space inside of the door frame, before water pressure is applied, so as to reduce the deflection of the door due to water pressure.

Also exterior metal or fiber glass-plastic bars may be attached to the outside of the elastomer door 110 and parallel to the internal strength members 154 in such a way that they will not interfere with the action of rollers 113.

Similarly, door 72, shown in FIGURES 9 and 10, is constructed in essentially the same manner as door 110. Door 72 is led by guides 74 and wound up on reel 76 after rolling over idler roller 75. Watertightness is provided by means of pneumatic gasket 74A. It will be appreciated that doors 110, 72 and 49 may be conventional sliding or hinged doors, with gaskets of either the solid rubber or pneumatic type; or only other suitable known watertight closure may be employed.

Figure 12:
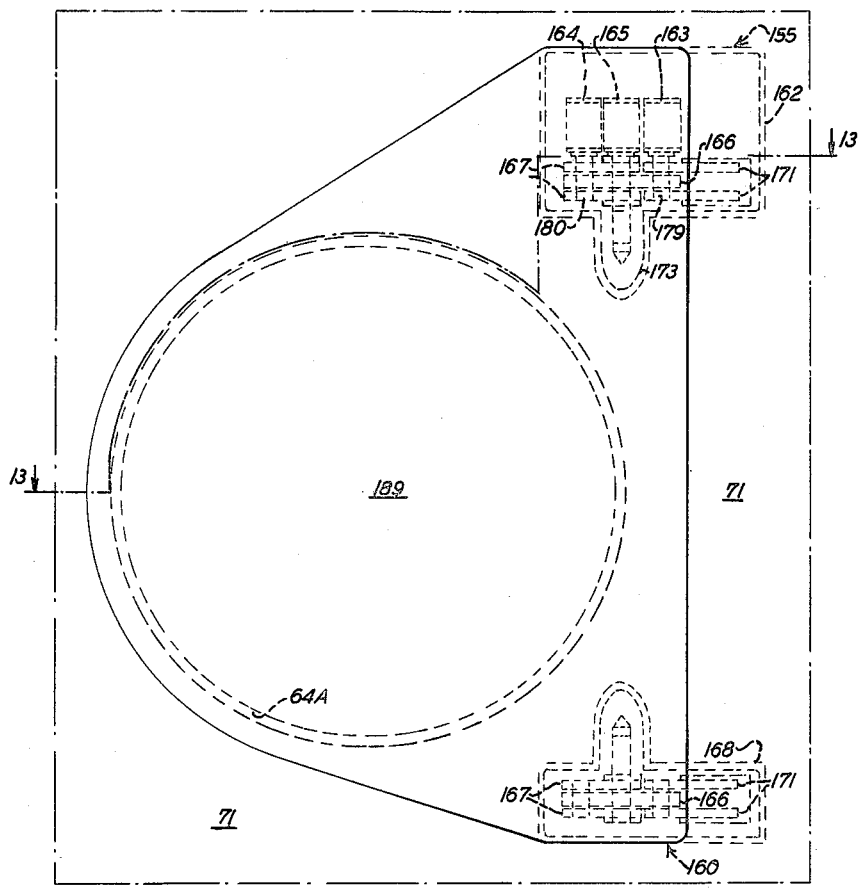
FIGURE 12 is a side view of the watertight side port door in the hull of the ship.
Figure 13:
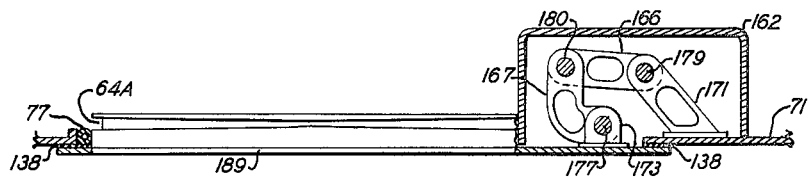
FIGURE 13 is a sectional view of the watertight door taken on section lines 13—13 of FIGURE 12.

FIGURES 12 and 13 relate to the underwater side port doors 189.

FIGURE 12 is an outboard profile of a hydraulically-operated underwater watertight side port door with the hinges and mechanism for operating the door located within the ship, thereby presenting a substantially smooth exterior hull surface.

Door 189 is hinged on its forward side at the top and bottom by a link motion assembly 155. A bracket 171 for supporting the door linkage is secured to the inner side of plating 71 of the ship's hull and constitutes the upper base for the door's linkage assemblage 155. Bracket 171 is connected on its free end to link 166 through a pin 179. Pin 179 is rigidly secured to link 166 and additionally is keyed to the shaft of actuator 163. The casing of actuator 163, in turn, is secured to base 171. Link 166 is connected on its further free end to a second link 167 by pin 180. Pin 180 is rigidly secured to link 166 and in addition is keyed to a second actuator 164. The casing of this second actuator 164 is rigidly attached to the second link 167. In addition, the second link 167 is connected on its further free end to the door 189 by means of pin 177 inserted in boss 173 which extends from the inside of door 189. Pin 177 is rigidly secured to second link 167 and is keyed to the shaft of actuator 165. The casing of actuator 165 is secured to the door 189. The upper link assemblage is housed in a watertight box 162 which is open to the sea when door 189 is opened. The lower link assemblage is similarly housed in a watertight box 168 also open to the sea when door 189 is opened. Watertight boxes 162 and 168 are constructed so as to prevent water from entering the interior of the ship. It will be noted that boxes 162 and 168 enclose boss 173 and the corresponding boss in the lower linkage assembly.

The lower link assemblage 160 is aligned with and corresponds to the upper link assemblage except that the actuators may be omitted, and it is contemplated that the weight of the door 189 will be substantially supported by the lower link assemblage. It should be noted that the upper and lower pins have their diameters graduated and stepped in to support properly the weight or buoyancy of side port door 189.

Door 189 when shut seals opening to antrum 73 by means of an O-ring pneumatic gasket 77 and the link assemblage boxes 155 and 168 by an outer gasket 138. It will be understood that gasket 138 is normally fastened to the ship's side or the door 189 and conforms to the shape of door 189 with portions removed corresponding to the port 62 and boxes 162 and 168. However, when O-ring 77 is deflated, and half doors 125 and 126 opened, water will enter into the antrum 73 (see FIGURE 3) to equalize the pressure inside and outside the door 189. A groove 64A corresponding to groove 64 in FIGURES 7A, 9 and 10 is located on the inner edge of door 189 to engage half doors 125 and 126 as shown in FIGURES 6 and 7, whereby door 189 may be locked closed.

Referring now to FIGURES 12, 13 and 14, operation of door 189 is as follows:

Electric motor 201 (FIGURE 4) drives a hydraulic fluid pump 195. Pump 195 is located in a lower level than the hydraulic fluid supply reservoir 193. Fluid from 193 passes through line 194 to pump 195 and is pumped through filter 196 and line 198 to accumulator 200. When the pressure, after the accumulator, is at the desired level, a pressure-actuated controller 203 turns off the electric motor 201. Should the pressure become less than the desired amount, the controller 203 again starts the pump, as is usual in marine practice. Hydraulic fluid from line 204 passes to a 3-position valve 205. At the start of the operation, the 3-position valve 205 is closed. To open door 189 the hand wheel of valve 205 is turned until fluid in line 204 passes through valve 205 into line 207. From line 207 the fluid passes through a T-connection 208. The hydraulic fluid passes through line 231 to piston valve 210 and also through line 225 and through needle valve 213 and line 226 to cylinder 211. The hydraulic pressure pushes against piston 211A which, in turn, is directly connected to a double piston 215 in valve 210, moving the piston 215 past an opening to line 183. Hydraulic fluid from 231 passes through 210 into line 183 to actuator 163. The hydraulic fluid remaining in actuator 163 from the previous closing operation of door 189 is released through line 184 and through space 219 into valve 210 and through line 192 to reservoir 193. Hydraulic fluid remaining in cylinder 211 from the previous closing operation of door 189 is released through line 228, needle valve 212, lines 227 and 216 to valve 205 and finally through line 218 to the reservoir 193. Remaining hydraulic fluid in the other end of cylinder 210 from the previous closing operation of door 189 is released through line 229 and line 216 to valve 205 and line 218 into reservoir 193.

During the foregoing opening operation, actuator 163 turns pin 179 counterclockwise 90° and link 166 similarly moves counterclockwise 90°.

In FIGURE 14, as the piston 211A continues to be moved by hydraulic fluid, it, in turn, pushes the piston valve 215 and an opening to line 185 is uncovered which receives hydraulic fluid. Hydraulic fluid passes then from line 185 into actuator 164. The hydraulic fluid in actuator 164 from the previous closing operation of door 189 is returned to reservoir 193 through line 186, valve chamber 219 and line 192.

During the foregoing operation, actuator 164 turns itself on pin 180 clockwise 90° and link 167 likewise turns in a 90° clockwise direction. Thus, it will be seen that while link 166 turns counterclockwise 90° on pin 179, link 167 turns clockwise 90° around pin 180 and door 189 moves smoothly out of the ship's side plating 71 substantially perpendicularly to plating 71.

Referring back to FIGURE 14, as piston 211A in cylinder 211 continues to be moved by hydraulic fluid, piston 215 uncovers the opening to line 187 and hydraulic fluid passes through line 187 to actuator 165. The hydraulic fluid in the actuator 165 from the previous closing operation of door 189 passes through line 188 into valve chamber 219, through line 192 into reservoir 193.

During the foregoing evolution, actuator 165 located on door 189 turns itself on pin 177 counterclockwise substantially 180°. Door 189 also moves counterclockwise and opens substantially 180°.

To close the door 189, valve 205 is set in its second position so that fluid under pressure from line 204 passes to line 216, to T-connection 214, and through line 227, needle valve 212, and line 228 into the other end of cylinder 211. From T-connection 214 hydraulic fluid also passes through line 229 to the other end of piston valve 210. As the hydraulic fluid pressure is applied to piston 211A, the piston 215 in valve 210 also moves in the same direction, passing between the aforementioned openings in sequence to lines 188, 186 and 184 and permitting hydraulic fluid to go to actuators 165, 164 and 163 in that order.

At the same time and in the same order the other end of piston valve 210 clears lines 187, 185 and 183 permitting the low pressure fluid from the actuators to return to the reservoir 193.

The low pressure hydraulic fluid in cylinder 211 which was used to open door 189 returns to the reservoir 193 through line 226, needle valve 213, line 225, line 207, and line 218. The low pressure hydraulic fluid in cylinder 210 which was used to open door 189 returns to the reservoir 193 through lines 231, 207 and line 218. During this period actuator 165 located on door 189 and boss 173 turns itself on pin 177 clockwise substantially 180° and since boss 173 is fixed to the door 189, the door 189 moves clockwise substantially 180°. Actuator 164 then turns itself on pin 180 counterclockwise 90° and link 167 likewise turns counterclockwise 90°. While this is going on actuator 163 turns link 166 clockwise 90° and the door 189 is brought smoothly inward parallel to corresponding portion of the ship's hull plating 71 and closed. Half doors 125 and 126 are then moved together into groove 64A and door 189 is thereby locked in place.

It will be recognized that parts of the lines 185, 186, 187, and 188 are made of flexible hose or jointed pipe.

Actuators 163, 164 and 165 are torque actuators. Any suitable actuator of this type known to the art may be employed. An example of such actuators is the Rotac Torque Actuators produced by the Ex-Cell-O Corporation of Detroit, Michigan, as disclosed in its catalog No. 26282. The stops for upper linkage motion are installed inside the casings of rotary actuators 163, 164 and 165. Interlocks may be employed so as to harmonize the sequence of the actuator operations. For example, interlocks may be provided whereby actuator 165 will always operate either before or after actuators 163 and 164 have completed their evolution, depending upon whether door 189 is being closed or opened.

It will be appreciated that the structure, including the antrums, locking device, watertight doors and side port doors on the ship, is interrelated and may be manufactured and assembled at a place removed from the ship. The same is true of the structure shown in FIGURES 9 and 10 and of the tunnel portion itself. Tunnels such as that made up by portions 3 and 25 may be carried aboard the ship.

In operation, a vessel 36 comes alongside pier 61 having tunnel 70 as shown in FIGURE 2. Ports 62 are aligned more or less with tunnels 70, and vessel 36 is secured to pier 61 by usual docking procedures, camels 66 being interposed between ship 36 and pier 61. Half doors 125 and 126 are opened disengaging slot 64A and doors 189, as desired, are opened, the inner watertight doors 72 being kept closed. If desired, doors 189 may be opened prior to coming along side pier 61. The structure on the pier side is as shown in FIGURES 9 and 10, door 110 being closed and tunnel 70 not yet positioned in port 62. To accomplish this, an operator (not shown) causes bogie 107A to travel on tracks 105 and lifts or lowers sleeve 88, carrying tunnel 70 by means of the hydraulic cylinder 102 and piston 109 until tunnel 70 is aligned with port 62. Motor 94 is then energized causing gear 92 to rotate on rack 93 thus forcing tunnel 70 outward into port 62 and antrum 73. Tunnel 70 is held to the correct distance of insertion by collar 70A.

With tunnel 70 inserted into port 62, O-ring gasket 77 is inflated locking the tunnel 70 in place and effecting a watertight seal. Half doors 125 and 126, heretofore opened, are closed into slot 64 firmly further securing tunnel 70 in place. When this is accomplished, the space within the pier antrum 80A, the tunnel 70 and the ship's antrum 73 may be evacuated of water by pumping means either through use of the ship's pumps or of pierside pumps. Another means to clear the water from this space is by injecting compressed air through line 134 from compressor 132 and forcing the water out through drain valve 133 and line 31.

When the water is out of the above-mentioned space, watertight doors 72 and 110 are opened and ramps such as ramps 81 and other connecting ramps are put into place. Cargo is then loaded and unloaded as desired between ship 36 and pier 61 through tunnel 70.

When vessel 36 rises or lowers because of the tides or the ship's loading, piston 109 in cylinder 102 causes tunnel 70 to retain its alignment with port 62. This may be done either manually or through automatic controls sensitive to the ship's relative position.

FIGURE 17 shows further embodiments of our invention. Tunnel 242 is made up of a continuous coil of elastic material of diamond or hexagon cross section. Each turn of the coil such as turn 260 is attached to the preceding turn 259 and the succeeding turn 261 (see FIGURE 21) whereby when a fluid or gas or combination thereof under pressure is introduced from any suitable source into said coils from inlet 262, tunnel 242 will extend outward and conversely when the inside of the coil is evacuated, the coil will collapse. The coil type tunnel 242 is curved to permit the tunnel to adjust more easily to different positions of ship 36 with the tunnel receiving means 247. FIGURES 18 and 19 show a ramp 265 inserted in tunnel 242. Preferably, ramp 265 will extend from the ship's tunnel receiving means 247 to the pier's tunnel receiving means 257. Ramp 265 is curved longitudinally to fit into tunnel 242. Braces or trusses 266 may be provided to strengthen the bottom of ramp 265. It will be understood that ramp 265 does not normally receive any support from the tunnel, but instead comprises a bridge within the tunnel. Tunnel 242 merely provides a watertight path between the ship 36 and the pier 61.

Thus, with the inclusion of ramp 265, tunnel 242 need not be so strong as to support the weight of cargo and cargo carriers between ship 36 and pier 61. Tunnel 242 may also be adapted to extend above the water line as does the tunnel in FIGURE 1.

FIGURE 20 shows a boom 270 with a cable 271 connected to tunnel 242. Boom 270 can be controlled and moved vertically and in an arc by any suitable means well known in the cargo handling art such as by control through winches 272 and cables 273. Thus tunnel 242 may, within limits, be positioned so as to be received by the ship's tunnel receiving means 247. Tunnels 240, 241 and 243 are all similar to tunnel 242. Tunnel 241 is collapsed in the pier's tunnel receiving means 256 and tunnel 243 is collapsed in the ship tunnel receiving means 248. Receiving spaces 245, 246, 247, 248, 255, 256, 257, and 258 have basically the same cooperating structure as shown in the ship's side in FIGURES 6–13. However, for the pier's tunnel receiving means 255, 256, 257 and 258, there is no necessity for doors such as 189, although these may be desired. The tunnels 240–243 are portable and may be secured to both pier and ship, as shown in FIGURE 6. If it is desired to store the tunnel in the receiving means 248, as shown, antrum 73 is made deeper athwartships and a second securing means of the kind in FIGURES 6 and 7 or other securing means is placed adjacent door 72 so that tunnel 243 my be collapsed entirely within ship 36 and door 189 appropriately secured by securing means adjacent thereto. Each end of each of tunnels 240–243 will have portions corresponding to the ends of tunnels 25 or 70 adaptable for watertight and firm securing to the ship or pier.

It will be recognized by marine architects and those skilled in the art that buoyancy creates certain problems in connection with underwater gear which entraps or contains air. For this reason, it is to be understood that the tunnel systems shown in FIGURES 3, 4, 9 and 10 will normally be constructed from materials sufficiently heavy to react against the buoyancy of the tunnels when they are filled with air. This may be augmented by adding weights or by anchoring arrangements as would occur to those skilled in the art. However, in the embodiments shown in FIGURES 17–23, we have employed a further means to counteract the buoyancy of the tunnel.

Thus in FIGURE 23, a tank 275 which may be located either on the dock 61 or ship 36 is filled with a high density salt solution or suspensoid, or other suitable high density fluid such as bromoform. To begin with, the tunnel 242 is in a position in pier 61 similar to tunnel 256 in FIGURE 17 or in a position in the ship 36 similar to tunnel 243 in FIGURE 17. That is to say, it is collapsed either in the side of the ship or pier. Pumps 277 and 279 are started to pump a mixture of air in line 280 and the heavy liquid from line 276 into line 281 and into the coils of tunnel 242 through inlet 262. The mixture or proportions of liquid and air are so controlled that the weight of the tunnel and the mixture within the tunnel coils approximate the weight of the water displaced by the tunnel, and pumps 277 and 279 are then secured. It will be understood that the proportions may be controlled manually or through appropriate automatic control. The pressure exerted by the mixture will cause tunnel 242 to extend outward where it is positioned to be received by the ship 36 or pier 61, as appropriate, and a watertight seal is secured by means previously described for the space within the tunnel. As the tunnel 242 is then evacuated of water, pump 277 is started and heavy liquid is pumped into the coil space displacing air therein which is vented through relief valve 283 into the top of tank 275 and finally to the atmosphere. Thus, as the water is displaced by air within tunnel 242, air is displaced by a heavy liquid within the surrounding coils. This may be controlled to maintain the tunnel 242 in equilibrium. Orifices 244 are provided longitudinally through the coils (see FIGURE 22) so that the air will be permitted to escape longitudinally along the top of tunnel 242.

When it is desired to remove the tunnel, the process is reversed. Relief valve 285, which is normally set at a higher pressure than relief valve 283, is now set at a lower relief pressure than relief valve 283. Air under pressure is pumped from pump 279 into the coils at the same time as tunnel 242 is being flooded, and a portion of the heavy liquid returns to tank 275 through valve 285. When the tunnel is completely flooded, the tunnel may be disconnected from the pier or ship as appropriate and the air and liquid remaining in the coils is pumped therefrom by evacuating pump 286 into tank 275. This will cause the tunnel coils to deflate and the tunnel to collapse either into the side of the pier or ship as desired.

It will be understood that the drawings in this case are diagrammatic and that details that would occur to those skilled in the art will have been omitted for purposes of clarity. For example, power sources, such as wires to motors, have been omitted inasmuch as it is well understood that electric motors will, of course, be suitably connected to an electric power source.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

We claim:

1. A vessel comprising: a hull; a plurality of substantially parallel watertight decks in said hull; a plurality of transverse substantially watertight bulkheads within said decks; a plurality of substantially watertight compartments contained within said decks, bulkheads and hull; side ports; at least one of said ports extending through the hull below the load water line of said ship into each of said compartments; and airlocks included in each of said ports; said airlocks each having watertight inner and outer doors.

2. For combination with a vessel having an underwater port in the side thereof with a watertight door, discharge and loading tunnel means for watertight connection with said port, comprising a first tunnel portion for connection to said port and a second tunnel portion for connection to a dock, said first and second tunnel portions being bendably interconnected whereby said first tunnel portion leaves said vessel substantially horizontally.

3. In a ship's cargo loading and unloading apparatus, tunnel ramp means, mounting means on one end of said tunnel ramp means for mounting said tunnel ramp means above water, and means carried by the other end of said tunnel ramp means to effect watertight connection substantially horizontally into a ship below water line, said tunnel ramp means being inclined at least in part with respect to the horizontal.

4. A discharge and loading tunnel ramp means according to claim 3 wherein said mounting means is adapted for connection to floating landing means.

5. In a ship's cargo loading and unloading apparatus, watertight tunnel ramp means, mounting means for a first end of said tunnel ramp means above water, means connected with said tunnel ramp means and operable to raise and lower the other end thereof above and below water, and means for effecting watertight connection of the other end of said tunnel ramp means with a below-water port in the side of a ship, said tunnel ramp means being inclined with respect to the horizontal.

6. The combination with a ship having a cargo loading opening in its side below the load water line, of a cargo passageway comprising an articulated watertight air-filled tunnel having one end secured to a pier above the load water line and slanting downwardly into and through said ship's side opening in watertight relation therewith.

7. The combination with a ship having a loading opening below water line, of a cargo loading and unloading passageway comprising a first tunnel section having one end secured to a pier above water level and sloping downwardly toward said opening, a second tunnel section extending substantially horizontally into and through said opening, first means effecting a watertight seal between said second tunnel section and said opening, and second means connecting contiguous ends of said sections in articulated watertight relation.

8. A ship's loading and unloading apparatus comprising first and second tunnel sections, means articulating said sections in watertight relation at contiguous ends, mounting means mounting said first section at its other end above water, for pivotal movement about a substantially horizontal axis, power means connected with said first tunnel section for so pivoting both said sections, and means maintaining said second tunnel section substantially horizontal for all positions of angular adjustment of said sections about said horizontal axis.

9. Cargo handling apparatus comprising a first tunnel section, trunnion means mounting said first tunnel section at a first end thereof for pivotal movement about a horizontal first axis normal to the axis of said section, sleeve means, means connecting said sleeve means with the second end of said first tunnel section for pivotal movement about a second axis parallel with said first axis, and parallelogram linkage means connecting said first tunnel section and sleeve means to maintain the latter horizontal for all angular positions of said first tunnel section.

10. An apparatus as recited in claim 9, said sleeve means having an axis of symmetry normal to said second axis, a second tunnel section, and means mounting said second tunnel section to said sleeve means for axial translation relatively thereto.

11. In a ship's cargo handling equipment, a support, a first rigid tubular tunnel section, trunnion means supporting one end of said first section on said support above water for pivotal movement about a first horizontal axis, power-operated means connected with said first section and operable to pivot the same about said first axis, a second rigid tubular tunnel section, means connecting said sections together at contiguous ends thereof in watertight relation for relative pivoting about a second axis parallel with said first axis and for axial translation of said second section, means carried by said second section for effecting a watertight seal with an underwater port in a ship, and means connecting said sections and effective to maintain said second section in fixed angular relation with the horizontal for all positions of angular adjustment of said first section about said first axis.

12. For combination with a buoyant vessel having an underwater port with a door in the side thereof, discharge and loading means comprising an air filled tunnel, a pier, an air filled watertight portion underwater within said pier, said tunnel interconnecting said portion and said vessel's port whereby dry cargo may be loaded or discharged between said pier and vessel through said tunnel.

13. A discharge and loading means according to claim 12 wherein said pier constitutes floating landing means.

14. A discharge and loading means according to claim 12 wherein said pier is under water.

15. In a floating pier, a watertight antrum in said pier, a watertight door into said antrum, a substantially horizontal tunnel portion in said antrum, said tunnel portion being horizontally and vertically movable with respect to said antrum, said tunnel portion being for watertight connection to an underwater port in a floating ship.

16. In a fixed pier, a watertight antrum in said pier, a watertight door into said antrum, said tunnel portion being horizontally and vertically movable with respect to said antrum, a substantially horizontal tunnel portion in said antrum, said tunnel portion being for watertight connection to an underwater port in a buoyant ship.

17. A watertight antrum in a submarine structure, a substantially horizontal tunnel portion extending from said antrum, said tunnel portion being horizontally and vertically movable with respect to said antrum, said tunnel portion being for watertight connection to a submarine port in a buoyant vessel.

18. Cargo handling apparatus for an underwater structure comprising a watertight antrum in said structure, a watertight door interposed between the space in said structure and in said antrum, a tunnel portion extending from said antrum, said tunnel portion being horizontally and vertically movable with respect to said antrum, and means for coupling the outer end of said tunnel portion in watertight relation with a submarine port in a buoyant vessel.

19. An underwater watertight pier facility comprising an air filled underwater watertight compartment, a watertight port in said compartment, a watertight dry cargo tunnel leading from said watertight compartment, the end of said tunnel being for watertight connection to an underwater port in the hull of a buoyant ship, and water evacuation means associated with said tunnel whereby water may be replaced therefrom with air when said tunnel effects a watertight connection between said compartment and an underwater port in the hull of a ship, said tunnel being movable horizontally and vertically with respect to said watertight compartment.

20. Cargo handling equipment comprising a dock, a hollow sleeve supported substantially horizontally by said dock in an underwater location, a tunnel for dry cargo slidably mounted in said sleeve for reciprocating movement in a substantially horizontal direction, means acting on said tunnel and controlled from said dock for advancing said tunnel in said sleeve for watertight attachment to an underwater port on a ship, and water evacuating means for removing water trapped in said tunnel when said tunnel connects said dock and a ship.

21. A tunnel comprising an inner portion, an outer portion around said inner portion, both the inner portion and outer portion being made of flexible material, said inner portion and outer portion being interconnected at a plurality of places, a substantially gastight space between said inner portion and said outer portion, and conduit means connected into said space through which substance under pressure may be introduced or withdrawn from said space.

22. A tunnel in accordance with claim 21 having a supply of high density liquid and delivery means to said conduit means whereby said high density liquid may be introduced or withdrawn from said space.

23. A tunnel in accordance with claim 22 having air introduction means associated with said conduit means whereby air under pressure may be introduced or withdrawn from said space with said high density liquid.

24. A combination of a vessel having an underwater cargo port for the loading and discharging of cargo carried by said vessel, a watertight door for said port, said door being substantially flush with the hull of said vessel, and means to open and close said door over said port, with a cargo handling apparatus comprising a pier, discharging and loading tunnel means extending therefrom for watertight connection with said port, and water-evacuation means to evacuate water from said tunnel means when said tunnel means connect said pier and said vessel.

25. Discharge and loading apparatus in combination with a ship having an underwater port with a door in the side thereof, said apparatus comprising an air filled tunnel, a pier, an air filled watertight portion under water within said pier, said tunnel means adapted to interconnect said portion and said ship's port whereby dry cargo may be loaded or discharged between said pier and said ship through said tunnel.

26. The method of level loading a ship with dry cargo which comprises projecting substantially horizontally outwardly and under water an open ended tunnel from a dock to and into an underwater port in a watertight vestibule in the side of a ship's hull, making a watertight connection between the open end of the tunnel and the edges of said port, evacuating water trapped in said tunnel from said tunnel and from said vestibule, establishing communication between the open end of the tunnel and the ship's hold, loading and unloading dry cargo substantially horizontally between the dock and the ship through said tunnel, and maintaining alignment between the tunnel and said underwater port as the ship rises or falls with respect to the dock because of the tides or the transfer of cargo.

References Cited in the file of this patent

UNITED STATES PATENTS

| | | |
|---|---|---|
| 649,784 | Weeks | May 15, 1900 |
| 987,017 | Robinson | Mar. 14, 1911 |
| 988,614 | Wotherspoon | Apr. 4, 1911 |
| 1,063,832 | Reiver | June 3, 1913 |
| 1,070,639 | Topper | Aug 19, 1913 |
| 1,106,074 | Bidlake | Aug. 4, 1914 |
| 1,225,662 | Lee | May 8, 1917 |
| 1,697,020 | Priebe et al. | Jan. 1, 1929 |
| 1,699,938 | Andvig | Jan. 22, 1929 |
| 2,243,914 | Martin et al. | June 3, 1941 |
| 2,335,450 | Sandberg | Nov. 30, 1943 |
| 2,363,797 | Lovfald | Nov. 28, 1944 |
| 2,389,353 | Foss | Nov. 20, 1945 |
| 2,513,152 | Delivuk | June 27, 1950 |
| 2,592,626 | Wanless | Apr. 15, 1952 |
| 2,688,761 | Good et al. | Sept. 14, 1954 |
| 2,699,746 | Kendall et al. | Jan. 18, 1955 |
| 2,700,169 | Henion | Jan. 25, 1955 |
| 2,778,632 | Mercier | Jan. 22, 1957 |
| 2,803,297 | Wenke | Aug. 20, 1957 |
| 2,942,816 | Dostie | June 28, 1960 |
| 2,945,465 | Barton | July 19, 1960 |
| 2,967,631 | Storma et al. | Jan. 10, 1961 |

FOREIGN PATENTS

| | | |
|---|---|---|
| 12,743 | Great Britain | of 1911 |
| 863,807 | France | Jan. 6, 1941 |
| 309,908 | Germany | Dec. 23, 1918 |
| 1,081,338 | Germany | May 5, 1960 |